(12) United States Patent
Abbiss et al.

(10) Patent No.: US 7,886,974 B2
(45) Date of Patent: Feb. 15, 2011

(54) SMARTCARD INTERFACE SYSTEM

(75) Inventors: Michael Edward Abbiss, Wannanup (AU); Ian Mark Coulson, Perth (AU); Anthony Charles Jarvis, Havelock North (NZ); Ian Ronald Anderson, Milford (GB)

(73) Assignee: Sequoia Smart Solutions Pty. Ltd., Subiaco (AU)

( * ) Notice: Subject to any disclaimer, the term of this patent is extended or adjusted under 35 U.S.C. 154(b) by 637 days.

(21) Appl. No.: 11/883,270

(22) PCT Filed: Jan. 16, 2006

(86) PCT No.: PCT/EP2006/050232

§ 371 (c)(1),
(2), (4) Date: Mar. 5, 2008

(87) PCT Pub. No.: WO2006/079594

PCT Pub. Date: Aug. 3, 2006

(65) Prior Publication Data

US 2010/0213254 A1    Aug. 26, 2010

(30) Foreign Application Priority Data

Jan. 27, 2005    (EP)    .................. 05100541

(51) Int. Cl.
*G06K 7/00*    (2006.01)
(52) U.S. Cl. ............... 235/439; 235/492; 235/380; 235/451
(58) Field of Classification Search ........... 235/439, 235/492, 451, 380, 375
See application file for complete search history.

(56) References Cited

U.S. PATENT DOCUMENTS

| | | | |
|---|---|---|---|
| 2004/0065734 A1 | 4/2004 | Piikivi | |
| 2007/0055630 A1* | 3/2007 | Gauthier et al. | 705/44 |
| 2008/0128513 A1* | 6/2008 | Hammad et al. | 235/492 |

FOREIGN PATENT DOCUMENTS

WO    WO 00/77717    12/2000

\* cited by examiner

*Primary Examiner*—Edwyn Labaze
(74) *Attorney, Agent, or Firm*—Alleman Hall McCoy Russell & Tuttle LLP

(57) ABSTRACT

A smartcard interface system is described. The interface system supports a plurality of different smartcard types. By providing a plurality interface modules and selecting an appropriate one of the available modules for effecting communication with a presented smart card, the system provides for interaction with the presented smart card in a manner specific to that smart card.

20 Claims, 5 Drawing Sheets

SMARTCARD INTERFACE SYSTEM

CROSS-REFERENCE TO RELATED APPLICATIONS

This is the United States national phase of International Application Number PCT/EP2006/050232, filed Jan. 16, 2006, which in turn claims priority to European Patent Application Number 05100541.1, filed Jan. 27, 2005, both of which are incorporated by reference in their entirety for all purposes.

TERMINOLOGY

Smartcard: A credit-card-sized card containing an integrated circuit chip and, optionally, a magnetic stripe, in which data is stored.

Contactless Smartcard (CSC): A Smartcard, containing an embedded radio frequency (RF) antenna, through which external communication is achieved.

Smartcard Terminal: A piece of electronic equipment, containing an electronic interface suitable for communicating with a smartcard.

CSC Terminal: A Contactless Smartcard Terminal containing, specifically, an RF interface facilitating communication with a CSC.

FIELD OF THE INVENTION

The present invention relates to smartcards and in particular to smart card interface system configured to interface with a plurality of smartcard types or applications so as to determine whether a presented smartcard is authorised to access or use applications enabled using smartcard technology. Preferably, the invention relates to a smartcard interface system providing controlled access to an environment based on a correctly presented smart card. The invention more particularly relates to an interface system utilised in a transport environment where a transport ticketing architecture or mechanism implemented using contactless smartcards is provided. The invention more particularly relates to an access control system incorporating a smartcard module which presents a common business-level interface to higher-tier computer systems whilst facilitating communication with a range of smartcards adhering to different standards. In the context of the present invention the term "module" refers to a combined hardware/software apparatus that includes one or more hardware and software components configured to achieve the result desired.

BACKGROUND OF THE INVENTION

Smartcards are well known in the art. The typical smartcard is dimensioned similarly to a credit card and can be fitted easily into a wallet. A contactless smartcard (CSC) differs from the traditional 'contact' credit card in that it includes a processor and memory embedded thereon and also includes a radio transponder so as to enable radio frequency (RF) communication between the smartcard and a smartcard terminal. The provision of the processor provides for more functionality and greater security on the card than are traditionally available on for example a magnetic stripe type credit card.

With the development of smartcards, many applications commensurate with the available functionality of the smartcard have also developed. Examples include security access cards, personal identification cards and recently the use of such cards in the transport arena where they are being used to replace the traditional magnetic stripe card ticket.

Advantages of the use of the smartcard, and particularly the CSC, as a ticket include the fact that the smartcard can process a transaction and update the date stored on the CSC much quicker than traditional cards (of the order of about 300 milli seconds) and as such its use improves the convenience and speed of access to transport by reducing the multiple seconds it otherwise takes to insert a ticket into a validating machine. Furthermore, since it is possible to identify the user, it is also possible to cancel the card in case of theft or loss. Further benefits include the facility to "reload" the ticket with value. Such advantages are leading to progressively more transport agencies around the world turning to smartcards for their ticketing.

In such ticketing arenas the user is provided with a smartcard ticket and on entry to the transport system, for example a Metro or Bus system, the card is read by a smartcard terminal, embodying many of the elements described in the following: An example of this arrangement is shown in FIG. 1. In this arrangement the user presents his CSC (100) at the bus for example. The card transmits the information relating to the card via an RF antenna (105) that is coupled via a hard-wired connection, such as for example a RS232 connection, to a Card Acceptance Device (CAD) (110). The CAD (110) includes a RF translator (110a) and a card driver module (110b). The information read by the CAD is then transferred on to a CSC terminal (115) where the processing of the information received from the CSC is conducted. The traditional model of CSC Terminal to CSC interaction involves the CSC Terminal connecting directly to a generic ISO-14443 Card Acceptance Device (CAD). The CSC Terminal is thus required to address the CSC at the 'driver' level: The smartcard terminal interfaces with the card using the low-level commands specific to the chosen smartcard technology, and is required to understand and manage the detailed file and data structures maintained on the card. This process requires the CSC Terminal to manage all of the hardware peripherals of the terminal (eg. screen, keyboard, LEDs, buzzer, gate-tripod or gate-flap, coin-mechanism, note-mechanism) as well as manage the CSC interaction, which includes: determine which type of card has been presented, perform the validation of the usability of the CSC, process the CSC data, update the CSC and report the transaction to a higher-tier computer, usually at periodic intervals such as when the bus returns to the depot. Moreover, each different manufacturer who supplies equipment to a transport system would, ideally, ensure that his CSC terminals process the various types of CSC in the same fashion as the CSC terminals of all other manufacturers supplying equipment to the system, in order that the user experience is common across the entire system. However, this is rarely achieved.

Additionally, where transport systems are operating in close proximity to each other (eg. near county or country borders), or in other situations which there is a political or commercial will to achieve 'interoperability', it is known for a specific transport provider, i.e. the transport provider with the license to operate in that geographic region, to roll out a system using the standard developed by one manufacturer and for a second transport provider to roll out a system using a second standard as provided by the manufacturer chosen for that implementation. In most cases, the standard developed by one provider does not conform to that developed by the second provider and as such it is not a trivial exercise to provide a ticketing solution that enables use of multiple transport solutions, or to provide a solution that crosses geographic borders. Developments towards solving this problem have led to the publication of generic transport communication language standards (for example (IOPTA). However, because there is no world-wide standards body which holds jurisdiction in all countries of the world, there are now a proliferation of these so called 'standards' across Europe, Asia and America. Furthermore, because the committees which provide these standards are often manned by representatives of the terminal manufacturers, and because of the multiplicity of card-types available, the standards tend to focus on the low-level CSC-Terminal-to-card interface and do not provide any generic business-level interface facility.

The advantages of providing an integrated transport system have been recognized in numbers of countries. For example, in another known standardization effort in the United Kingdom, public transport executives, bus operators and the franchisees of the UK Rail Network came together in 1998 to form the Integrated Transport Smartcard Organisation (ITSO) which had at its core the development of a multimodal smart card based transport initiative. ITSO's efforts in providing a solution to the problem of interoperability included the publication of yet another 'standard' and the development of an ITSO-specific Security Access Module (SAM). The ITSO SAM was aimed at providing a common mechanism, through which, (i) the authenticity and integrity of ITSO-compliant CSCs could be validated, and (ii) the communication of the CSC transactions to higher-tier computers could be achieved with integrity. However, ITSO was simply another in the multiplicity of published 'standards' and the ITSO SAM has, at this time, not delivered an interoperable solution across multiple smartcard types.

There is therefore still a need to provide an integrated architecture that utilizes the benefits of contactless smart cards which (i) can be used, interoperably, across a variety of different CSC types and/or transport systems, (ii) provides a common user experience even in the presence of CSC terminals from different manufacturers, and (iii) elevates the interface to the CSC from the card level to a business level.

SUMMARY OF THE INVENTION

These and other problems are addressed by a smart card interface system in accordance with the present invention which provides (i) a Self-Sufficient Platform (SSP), (ii) the super-imposition of a Business Engine on the SSP, and (iii) the association of an external business infrastructure through which a universal smartcard module (USM) (in particular, its business rules) is configured, and with which the USM communicates.

In a preferred embodiment where the interface system is deployed in a transport environment, the SSP provides the environment, through which the USM may (i) establish an interoperable interface with a variety of CSC types from one or more transport systems, (ii) communicate both locally (eg. within a single bus, or tram, or within a railway station) and globally (eg. with higher-tier computers at physically different locations), (iii) determine its position, globally (eg. in terms of navigation co-ordinates, whilst operating within the environment of a bus or other vehicle travelling along a regular passenger-serving transport route) and (iv) achieve security of the information which is to be communicated outside of the domain of the individual USM.

The Business Engine provides the environment in which the business functionality common to transport operations (eg. create card, personalise card, create application, create product, validate product, hot-list card, top-up product, use product, delete product) can be executed in a common fashion, regardless of the type of CSC presented, and regardless of the manufacturer to whose terminal the CSC is presented).

The external Business Infrastructure provides the facility through which all of the business rules, to be executed when a CSC is presented to a CSC Terminal, are developed and tested. Furthermore, the business infrastructure is based upon technology which permits the computerised business rules developed in the external infrastructure to be downloaded, without change, to the operational environment of the USM. This is a departure from the traditional approach, in which, the business rules developed in the external infrastructure require 'porting' to the individual operating environments of the various CSC Terminal types.

Finally, the invention (i.e. The USM and its external business infrastructure) allows for the development and testing of business-level processing rules, for use with multiple CSC types, in an interoperable manner, in CSC terminals supplied by multiple manufacturers, and the provision of the final code for the execution of these rules prior to even the selection of the manufacturers who are going to supply equipment to the scheme, and certainly before the supply of any CSC terminals to the operational environment.

To enable these and other advantages, the present invention provides an interface system according to claim 1. Advantageous embodiments are provided in the dependent claims. The invention also provides a method whereby contactless smart cards of multiple types or having multiple applications stored thereon may be interrogated so as to select the correct interface for that specific smart card at that specific time. Such a methodology is provided in claim 16 with advantageous embodiments provided in the dependent claims thereto.

BRIEF DESCRIPTION OF THE DRAWINGS

The present invention will now be described with reference to the accompanying drawings in which.

DETAILED DESCRIPTION OF THE DRAWINGS

The prior art has been described with reference to FIG. 1. The present invention will now be described with reference to FIGS. 2 to 4. These figures illustrate a preferred embodiment of an interface system in accordance with the present invention where the system is implemented in the context of a transport architecture. Such an embodiment, it will be appreciate is exemplary of the type of interface control that may be achieved using the present invention and it is not intended to limit the invention in any way except as may be deemed necessary in the light of the appended claims.

Figure 1:
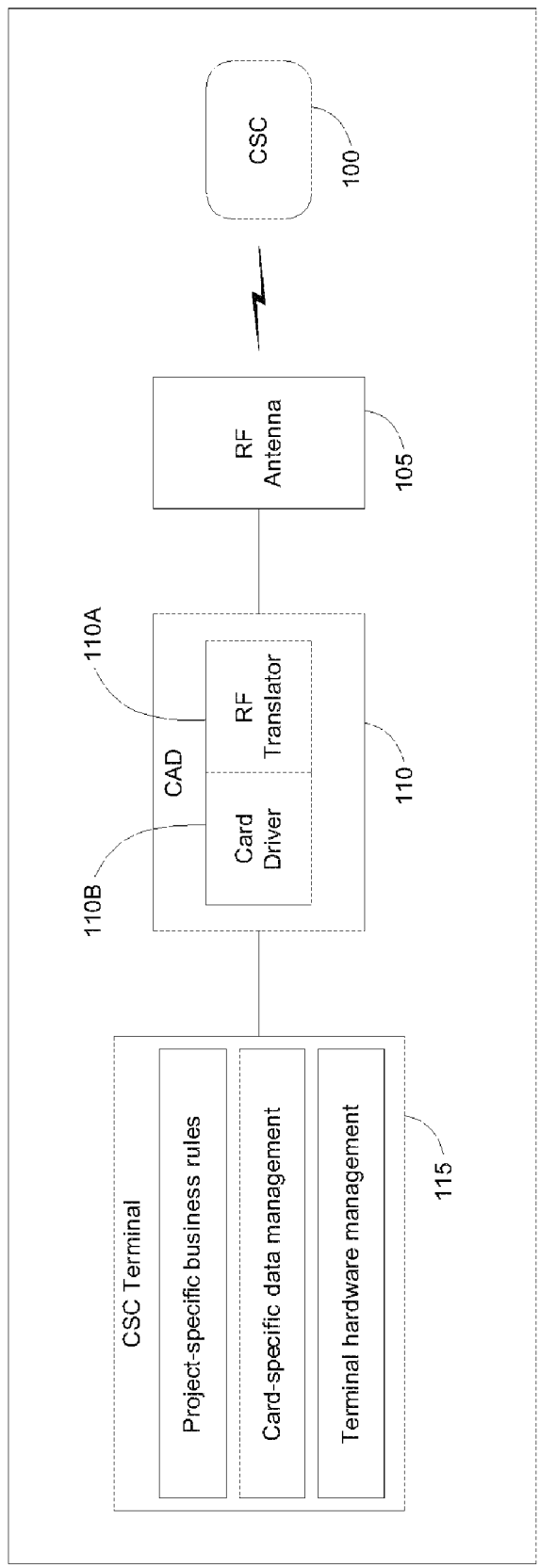
FIG. 1 shows a known architecture for use in transport systems.
Figure 2:
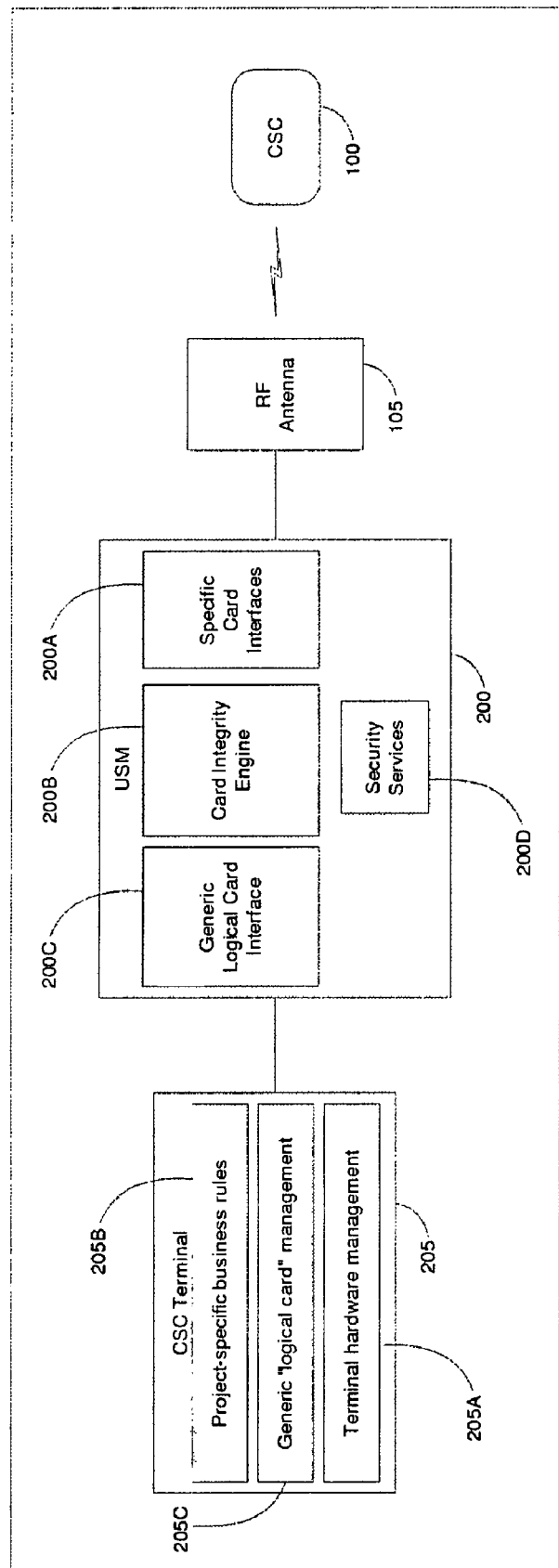
FIG. 2 shows an architecture according to a first embodiment of the present invention.

As will be evident from an examination of FIG. 2 which illustrates a transport architecture according to the present invention with like components to that of FIG. 1 identified with the same reference numerals, the present invention utilises a contactless smart card 100 which communicates via an RF Antenna 105 to hardware components which access applications stored on the smartcard. In accordance with the present invention, this interface between the smartcard and the hardware components is via a Universal Smartcard Module USM, 200. The USM is coupled to the RF antenna to enable communication with the smartcard and is connected via a data cable to the traditional CSC Terminal. The USM may be physically located either within or on the external housing of the CSC Terminal. The USM 200 of FIG. 2 includes a set of specific card interface modules 200A, a card integrity engine module 200B, a generic logical card interface module 200C, and a security services module 200D. The number of the card interface modules 200A incorporated within a specific USM will depend on the specific roll-out application for that USM, in that specific geographic areas will require the ability to interface with different types of CSC's to that of other roll-outs. It will be appreciated that in accordance with the present invention the number of card interface modules 200A could be updated at a later time to the initial number incorporated in the USM 200. Similarly, where a smartcard is presented with multiple applications stored thereon, the interface modules are configured to select the correct application for the present interaction.

The determination of the specific Card Interface Module, appropriate to processing a presented card, is based typically upon the hierarchy of:
1) Manufacturer:
2) Card-Type:
3) Application.

Using such a hierarchical interrogation sequence it is possible to quickly and accurately determine the correct interface language that should be used for subsequent communication with that smartcard.

On receipt of a notification from the antenna 105 that a CSC is trying to initiate a communication with the transport mechanism, the USM is configured to interrogate the CSC so as to determine which of the specific card interface modules should be used for subsequent communication. This interrogation is effected on the basis of a number of interrogatories. Firstly, the response using the standard ISO 14443 'Poll' command yields an ISO-compliant manufacturer's identifier. Further parsing of the response facilitates selection of the manufacturer's specific Card-Type. Once the Card-Type is known, its ability to concurrently support multiple Applications is implicitly known (from information programmed and stored on the USM), as is the structure of the Application Identifiers. For single-application cards, the associated Card Interface Module is immediately selected. For multiple-application cards, once the Application Identifier is retrieved, the associated Specific Card Interface Module can be selected. If there is no module associated with the retrieved Identifier, then the card is rejected as 'unsupported.' This can be logged separately for part of a report structure so as to provide an analysis at a later date as to the need for additional card interface modules to be incorporated at a future date.

The Generic Logical Card Interface module 200C presents a business-level view of a generic logical card, which is independent of both the specific card technology chosen, and the detailed structure of the files and data stored on any of the supported card types.

The Card Integrity Engine 200B component of the USM is responsible for managing the various data files, labels and indexes which are associated with the structure of applications, files and data-fields which are distributed throughout each of the supported card types. The Card Integrity Engine ensures that only consistent sets of data are committed to a card during a smartcard 'transaction'.

The Security Services 200D component of the USM is desirably embodied in a tamper-proof hardware Security Access Module (SAM) and performs all of the cryptographic functions necessary for interaction with the supported card types, at both technology and business levels, (i) ensuring that valid data is cryptographically 'sealed' before it is written to the card, and (ii) validating existing cryptographic seals in order to present, to the CSC Terminal, business data which has been cryptographically validated for integrity and authenticity. Through its tamper-proof capabilities, the SAM also provides the location for the secure storage of the secret digital keys which are required to execute the cryptographic algorithms. It will be appreciated that the Hardware Security Access Module (SAM) enables concurrent cryptographic management and secure key storage for interaction with smartcards complying with different standards, including IOPTA, ITSO and RIS-300 and the like.

It will be appreciated that each of the card integrity engine 200B, the security services 200D, and the generic logical card interface module are configured to communicate in specific CSC independent languages, with the commands and communications then being translated by the appropriate card interface module 200A for interaction with the CSC. As such the level of functionality that can be provided by the USM is greater than that traditionally available at the point of interaction with the CSC. The USM enables a generic programming of functionality which is only translated to CSC specific interaction languages at the time of interaction.

The USM 200 is further programmable to present data, to a CSC Terminal 205, in accordance with any desired industry standard (eg. CEN EN-1545: IOPTA). The interface between the USM and the CSC Terminal is a typically implemented using a 'serial' link supporting industry-standard communications protocols, including RS-232 and USB-2. It will be understood that all CSC applications utilise a CSC terminal with the level of hardware functionality supported or provided by the CSC terminal depending on the specific application. For example in a ticketing environment, a CSC terminal typically includes a screen so as to enable a display of commands for a user, a barrier control which will be activated on presentation of an authorised CSC, and one or more LEDs which will be activated to as to indicate that a user may proceed or should wait. In other applications, a CSC terminal may not be used to control barriers and as such barrier control is not supported.

In summary, (i) the Specific Card Interfaces of the USM accommodate the various supported card technologies and data structures in accordance with the supported standards, (ii) the Card Integrity Engine maps business-level functionality to card-level instructions ensuring that the data written to each card is internally consistent, (iii) the Security Services module establishes the integrity and authenticity of the transaction, and (iv) the Generic Logical Card Interface presents a common business-level interface to CSC terminals, regardless of which system, technology or standard is associated with the presented card. It will be understood therefore that the embodiment of FIG. 2 introduces a Generic Logical Card Platform, which facilitates the replacement of Card-specific Data Management by the CSC Terminal with a generic "logical card" management interface 205C. The architecture of the present invention also introduces a Security Services module, which provides, generically, the cryptographic services and secure key storage necessary for interfacing with all of the supported card-types, in accordance with the supported standards.

Figure 3:
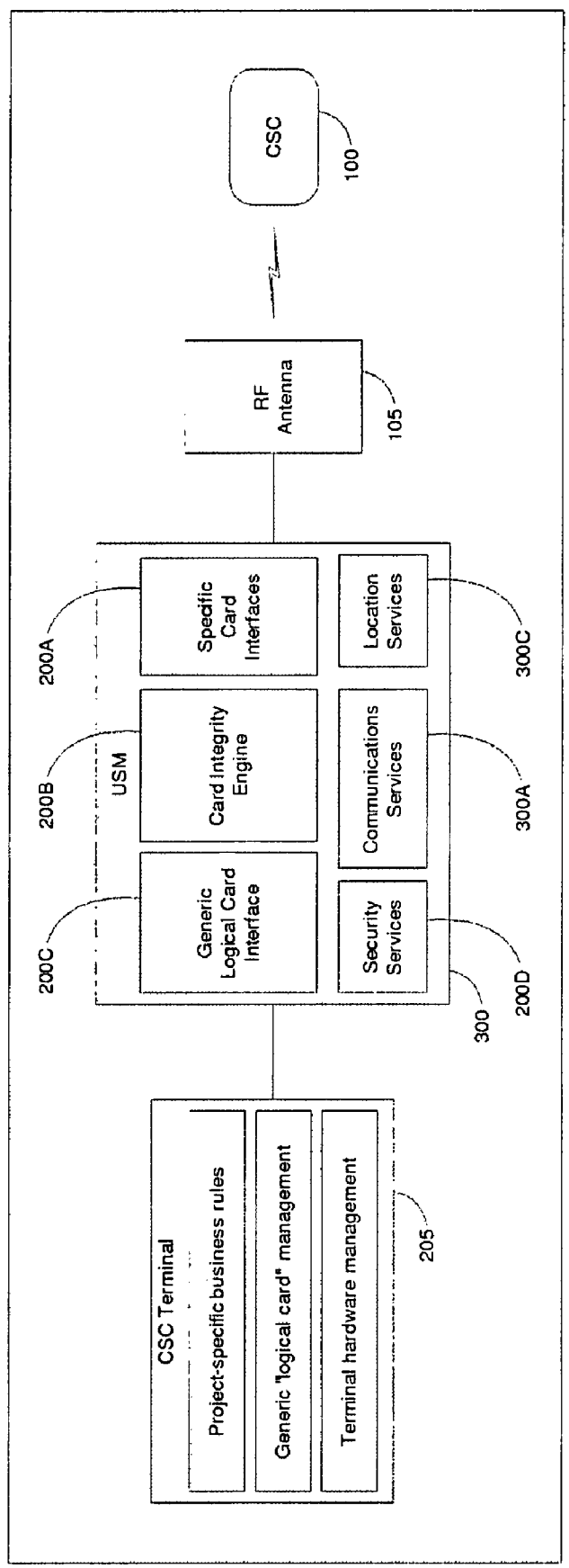
FIG. 3 shows a modification of the architecture of FIG. 2 in accordance with a further embodiment of the invention.

FIG. 3 shows further extension to the USM of FIG. 2 to the point where the platform becomes self-sufficient as a basis for further business-level processing (to be described in relation to later figures). In this embodiment of the invention the USM 300 includes the components present in the USM of FIG. 2 but additionally includes communication" capabilities.

One example is the addition of a communications module 300A. The 'Communications' module 300A is multi-modal, including both 'local' wireless communication (achieved by means such as the provision of an 802.11x WiFi wireless transceiver), and 'global' wireless communications (achieved by means such as the provision of a GSM or GPRS wireless transceiver). By including such communication means into the USM it is possible to relay information collected on an individual USM both to peer USMs in locally-located CSC terminals (eg. between CSC Validators and Bus-driver Consoles) and to remotely-located higher-tier computers (eg. Railway Station computers), in a real time environment. The CSC Terminal therefore does not require any interface to enable it to communicate with external networks or systems. This is advantageous when compared to prior art implementation which could only provide this information on return of the bus to the depot, or, at railway stations and ferry piers, via the hard wire link interface provided there to enable an update of the central computer.

Hence, the USM according to FIG. 3, provides the means, by which, the CSC Terminal can be connected into a network of computers and electronic devices which comprise an Automated Fare Collection (AFC) system, without the need for cabling. This resolves three sets of problems:

1. the work involved in introducing or upgrading the communications capability of CSC terminals to handle the additional volume of data associated with CSC processing and its attendant security requirements,
2. the effort involved in laying or re-routing network cabling whenever AFC terminals are introduced or moved (which often involves jack-hammering the concrete of operating metro station platforms), and,
3. the difficulty in achieving regular communication with terminals in vehicles (eg. buses) which can often spend days between visits to depots, where the traditional solution to the problem is to store information in the CSC terminals on the vehicles and transfer it whenever the vehicle returns to a depot, thereby imposing an additional data storage capability requirement upon CSC Terminals; which becomes a burden upon older-generation terminals of limited hardware capability.

The USM provides on-going communication with both fixed and mobile CSC Terminals, without any requirement to provide cabling or other network infrastructure, and in the process, minimises the on-board data storage capability requirements of the CSC terminals. Meanwhile, the CSC Terminal can continue to process magnetic tickets using its existing processing and storage capability and its existing communications infrastructure, in parallel with the CSC processing capability added by the USM.

"Location" capability within the USM may also be provided by a modification such as that shown in FIG. 3. In this example of the architecture, a location module in the form of a GPS Receiver module 300C may be included within the USM. Such an USM adds the facility to identify the position, in GPS co-ordinates, of the CSC Terminal. This facility allows CSC terminals in vehicles travelling along configurable routes, to automatically increment stages and/or change zones, as the journey progresses. The traditional approach to this problem has been to have the driver of the mobile AFC equipment press a 'Stage Increment' button as the journey progresses, or to add an external GPS sub-system.

Figure 4:
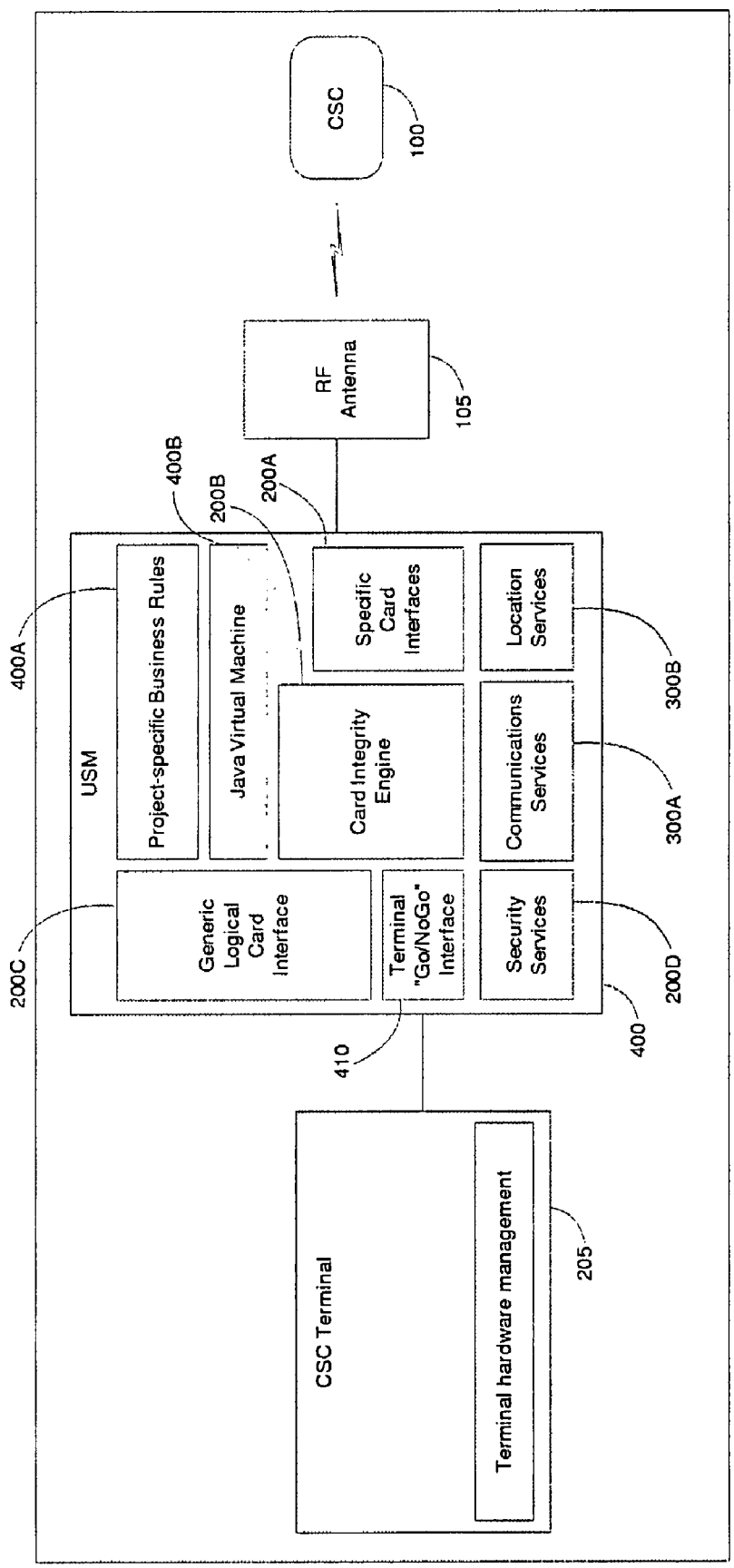
FIG. 4 shows a further modification to the architecture of FIG. 2 in accordance with yet a further embodiment of the invention.

The association of all of these facilities within a single module, the USM, provides a self-sufficient platform (i.e. one which requires no additional supporting infrastructure, and hence, which can be "bolted on" to existing AFC equipment) upon which a Business Engine can now be built. It will be understood therefore that the modification provided by the architecture of FIG. 3 provides for the realisation of the Self-Sufficient Platform, which gives the platform knowledge of its location along with the means of communicating outside the domain of the USM:

A further extension to the USM of FIG. 3, introduces a Business Engine USM 400 as shown in FIG. 4. Such an USM incorporates software such as that implemented using a Java Virtual Machine (JVM) 400B, upon which, AFC business rules can be executed in Java code.

The term 'AFC Business Rules' encompasses the set of algorithmic and referential processes which are (a) performed upon the data retrieved from the CSC, and (b) performed to created the new information to be written back to the CSC during a transaction. Such business rules may be stored on a local cache provided by a project specific business rules module 400A. Business rules include such phases as:

1. 'validation' processing (such as confirming that the Card Identifier is not on a Card Hotlist, confirming that the Purse Balance is non-zero)
2. 'selection' processing (such as evaluating the set of Products maintained in the CSC, and determining the appropriate one to use for the transaction about to be performed)
3. 'calculation' processing (such as determining, from boarding and alighting stages, and passenger class, the correct fare to be charged)
4. 'update' processing (such as determining from initial Purse Balance and Fare-charged, the new Purse Balance to be written back to the CSC).

This facility allows an industry-standard programming language to be used in coding the business rules to be executed within the CSC Terminal, and hence, removes the requirement for specific business rules to be ported to multiple device platform environments, with the associated individual testing regime overheads necessitated by the potentially-different translations performed during the porting activities.

The execution of the business rules in the USM, once again, minimises the storage and processing capability requirements of existing AFC equipment being upgraded to accommodate smartcards.

The USM may be further configured to include a go/no-go interface 410. The Go/No-Go Interface module 410 provides the means by which the USM and the CSC Terminal communicate their 'states' of operation. For example, the CSC Terminal may be processing coins or notes, and may wish to ensure that the USM does not begin processing the CSC until the correct money has been paid. Conversely, the USM may be processing the CSC and may wish to ensure that a Railway Gate barriers does not open until the CSC has been successfully validated and processed. The Go/No-Go Interface is a bi-directional digital signalling component which enables the USM and its host Terminal to co-ordinate their respective processing responsibilities. The Go/No. Go module is defined by an Application Programmer's Interface (API) specification.

Figure 5:
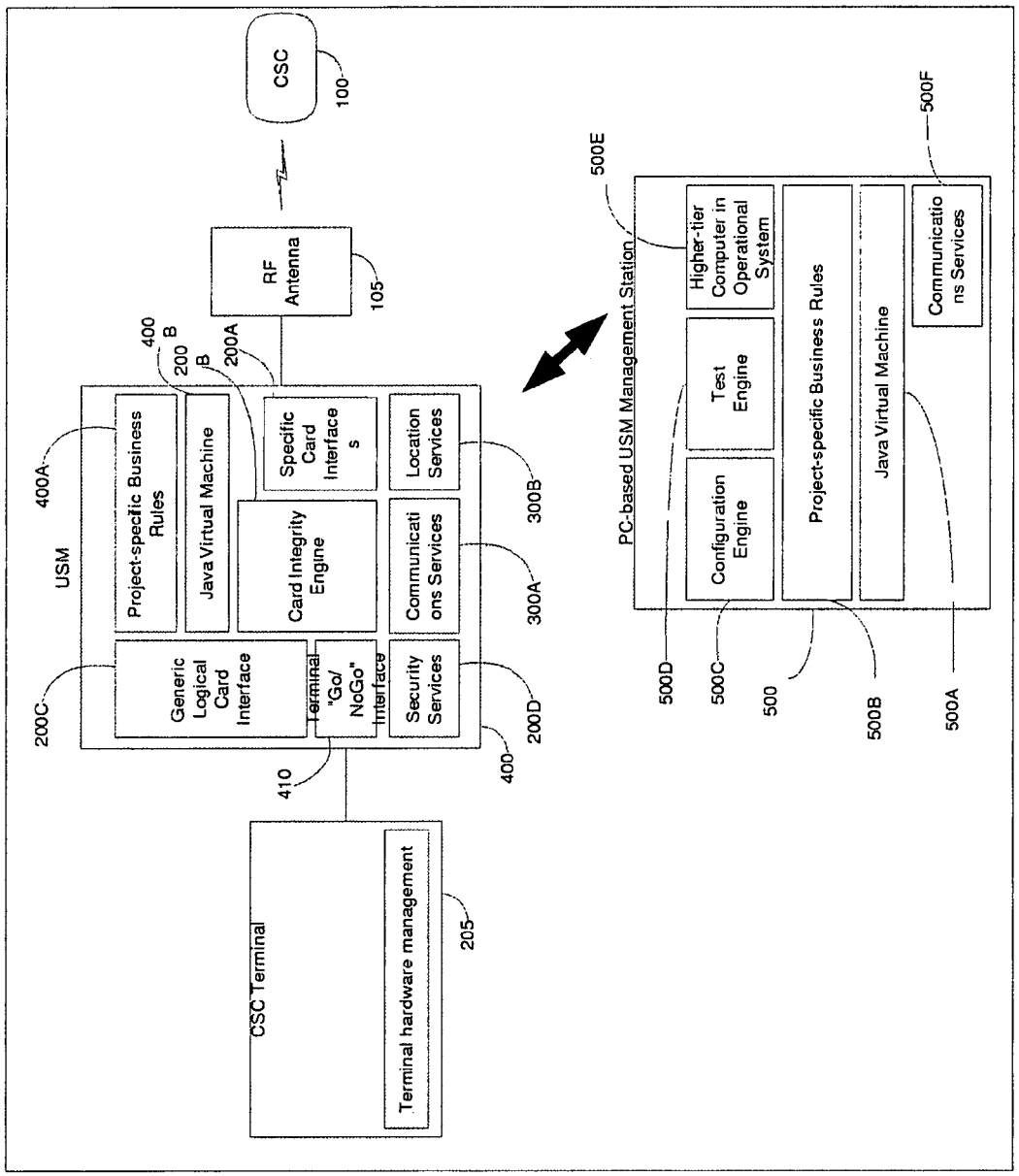
FIG. 5 shows an alternative architecture in accordance with a further embodiment of the present invention.

According to the modification provided by the embodiment of FIG. 5, a business engine is incorporated. The Business Engine USM achieves its full value as an element of the Business Rules Infrastructure. The Business Rules Infrastructure employs two key components:

1. a java-enabled Business Engine USM as described above with reference to FIG. 4, and,
2. a java-enabled PC-based USM Management Station 500.

The USM Management Station is equipped with a readily-available third-party JVM (Java Virtual Machine) 500A such as those known and built for PC hardware and operating system platforms. The USM is equipped with a high-performance JVM built into the processor hardware of the USM platform. Both JVMs interact with a project specific business rules modules, the module 500B provided on the PC Management station 500 being configured to enable a writing of Business Rules software, written in Java. Accordingly, the PC-based USM Management Station can be used in an office environment to configure, using a configuration engine 500C, all of the smartcard-related business rules to be implemented in the operational system, and to then test, using a test engine 500D, those same Smartcard-related business rules to be performed on the CSC Terminal prior to them being provided to the remote USM 300. Once the necessary rules have been tested in the test environment provided by the PC management station 500 it is then possible to communicate the fully tested version via communication channels 500F to one or more remote USMs where they are stored and activated using their specific project specific business engines 400A and JVMs 400B, with confidence that the code which is being tested on the USM Management Station will be downloaded, unchanged, to operate in the USM of the CSC Terminal. This eliminates the dual problems of:

1. having to translate business rules into specific software implementations, applicable to the computing platform of each different CSC Terminal, and,
2. having to independently test the implementations of business rules in every different terminal-type in the system.

It will be appreciated that the architecture of the present invention provides a number of advantages over the prior art. By providing an architecture incorporating a USM it is possible to provide a single, unified means by which:

1. smartcards of different technologies, and internal data structures, and relating to different transport systems, can be processed through a common logical interface.
2. smartcards of different transport systems, operating in areas where inter-operation of the overlapping systems is required (e.g. at and around county borders) can be processed by the smartcard terminals of both systems.
3. smartcard technology can be introduced by transport providers without them needing to scrap their investment in existing ticket-processing equipment.
4. smartcard-related business rules can be specified and tested in an office environment, and then implemented in the distributed equipment of transport providers without the need for either translation to the specific hardware environment of the CSC terminal manufacturer or individual testing on a per-manufacturer basis.
5. the definition, implementation and verification of smartcard-related business rules can proceed whilst decisions are still being made about the physical sourcing and design of the computers and electronic equipment which will ultimately constitute the components of the implemented transport system.

Although the invention has been described with reference to a deployment in a transport arena, it will be appreciated that this is exemplary of the type of interface application that is suitable for use with the present invention. By providing multiple interfaces, each of which is configured to communicate with a specific CSC in a language specific to that CSC, the invention enables the use of smartcards of multiple manufacturing types and having multiple applications to be deployed. For example, a transport provider may not wish to give exclusive rights to one CSC manufacturer to provide all smartcards for use with that transport provider. The present invention addresses this by providing interfaces for multiple smart cards. Additionally, a user may have multiple applications stored on their personalised smart card—one application for example being a ticket for the metro, another being a ticket for the theatre. When they are going into town to go to the theatre, they present their smart card at the ticketing system deployed at the metro. The interface modules provided by the present invention interrogate the card, determine that the card has an application configured for ticketing purposes for the metro, deducts a correct tariff for the metro journey and allows the person to proceed. On arrival at the theatre, the person presents the same smartcard to the theatre ticketing system, which using the interface modules of the present invention, determines that there is a theatre ticketing application stored on the card, and processes that application to allow access to the theatre. All of this multi functionality is achieved in a seamless way without requiring any user interaction—all that is required is a presentation of the smartcard and the USM effects the correct processing, irrespective of the manufacturer of the specific smartcard.

It will be appreciated therefore that a smartcard interface system is described. The interface system supports a plurality of different smartcard types. By providing a plurality of interface modules and selecting an appropriate one of the available modules for effecting communication with a presented smart card, the system provides for interaction with the presented smart card in a manner specific to that smart card. Therefore, although the invention has been described with reference to a preferred embodiment of application in a transport environment, it is intended that the invention shall not be limited in any way except as may be deemed necessary in the light of the appended claims.

The words comprises/comprising when used in this specification are to specify the presence of stated features, integers, steps or components but does not preclude the presence or addition of one or more other features, integers, steps, components or groups thereof.

The invention claimed is:

1. A contactless smartcard interface system for use with hardware processing equipment, the hardware processing equipment including an RF antenna configured to enable communication with one or more presented contactless smartcards and a contactless smartcard terminal configured to manage peripheral hardware components, the contactless smartcard interface system including a universal smartcard module, the universal smartcard module being configured to be provided between the RF antenna and the contactless smartcard terminal and being further configured to communicate with presented contactless smartcards, the universal smartcard module including a plurality of interface modules, each of the plurality of interface modules being associated with a specific supported contactless smartcard type and differing from others of the plurality of interface modules in a language used to interface with their specific contactless smartcard type, the universal smartcard module being configured, on receipt of a communication from a contactless smartcard via the RF antenna, to determine a correct interface module with which to conduct subsequent communications with that contactless smartcard and to use that interface module for that subsequent communication.

2. The system of claim 1, wherein the universal smartcard module includes means to initially interrogate a communication request received from a contactless smartcard to determine a correct interface for subsequent communication with that contactless smartcard based on at least one of manufacturer, contactless smartcard type, and application.

3. The system of claim 1, wherein the universal smartcard module includes a Generic Logical Card Interface module configured to enable communication between the universal smartcard module and the contactless smartcard terminal in a language independent of a specific contactless smartcard technology chosen.

4. The system as claimed in claim 1, wherein the universal smartcard module further includes a Card Integrity Engine responsible for managing data files, labels and indexes which are associated with a structure of applications, files and datafields which are distributed throughout each supported contactless smartcard type.

5. The system as claimed in claim 1, wherein the universal smartcard module further includes a Security Services component, the Security Services component being configured to perform cryptographic functions on communications between the universal smartcard module and a presented contactless smartcard.

6. The system as claimed in claim 5, wherein the security services component is provided in a tamper-proof hardware Security Access Module.

7. The system as claimed in claim 6, wherein the Security Access Module is configured to store a plurality of cryptographic keys, the cryptographic keys being required to enable an encryption of communications between the universal smartcard module and a presented contactless smartcard.

8. The system as claimed in claim 1, wherein the universal smartcard module includes communication means configured to enable wireless communication between a remote universal smartcard module and a central control computer.

9. The system as claimed in claim 8, wherein the universal smartcard module includes a location module configured to enable at least one of:
   identification of an actual geographic location of the universal smartcard module and to effect a communication of that location to the central control computer, and
   local processing including charging of distance based fares, which requires knowledge of location.

10. The system as claimed in claim 1, wherein the universal smartcard module includes a software module, the software module being configured to enable an execution of a set of algorithmic and referential processes which are
   performed upon data retrieved from the contactless smartcard, and
   performed to created new information to be written back to the contactless smartcard during a transaction.

11. The system as claimed in claim 10, wherein the set of algorithmic and referential processes are storable on a local cache resident on the universal smartcard module.

12. The system as claimed in claim 10, further including a test server, the test server being remote from but in communication with the universal smartcard module and incorporating a separate software module, to that located on the universal smartcard module, the test server being configured to enable a configuring of one or more algorithmic and referential processes and a testing of same prior to a communication of those processes to the universal smartcard module.

13. The system as claimed in claim 1 wherein the universal smartcard module enables a selection of an appropriate application, from a plurality of available applications stored on the presented contactless smartcard, for subsequent processing, wherein communication between that selected application and the universal smartcard module is conducted through an appropriate interface module.

14. The system as claimed in claim 1, wherein each of the plurality of interface modules differ in a language that they use to communicate with their corresponding presented contactless smartcard.

15. The system as claimed in claim 1, wherein the universal smartcard module enables a selection of an appropriate application for processing from a plurality of available applications stored on the contactless smartcard dependent on a context in which the contactless smartcard is presented to the universal smartcard module.

16. A method of supporting multiple different smart card types within a smart card processing architecture, the smartcard processing architecture including an RF antenna configured to enable communication with a presented contactless smartcard and a contactless smartcard terminal configured to effect a processing of ancillary hardware components of the smart card processing architecture, the method including:
   providing multiple interface modules, each of the interface modules being associated with a specific smart card type, and
   on receiving an initial communication request from a presented contactless smartcard via the RF antenna, selecting an appropriate interface module from the multiple interface modules available for subsequent communication with that contactless smartcard,
   wherein each of the multiple interface modules differ from one another in a language they use to interface with their specific contactless smartcard type.

17. The method as claimed in claim 16, wherein the smart card type is defined by at least one of
   smart card manufacturer, and
   smart card application stored on that smart card.

18. The method as claimed in claim 16, further including
   storing a plurality of rules, each of the rules determining how a specific smart card type should be processed, the rules being stored in a language independent of that specific smart card type.

19. The method as claimed in claim 18, further including, on effecting a communication with a specific smart card, translating the rules stored to a language suitable for that specific smart card type and communicating those rules to the specific smart card in that language.

20. The method as claimed in claim 19, further including encrypting any communication with the smart card.

* * * * *